United States Patent [19]
Schaefer

[11] 3,717,421
[45] Feb. 20, 1973

[54] APPARATUS AND METHOD FOR A LIQUID LEVEL SENSOR

[75] Inventor: Edward J. Schaefer, Bluffton, Ind.

[73] Assignee: Franklin Electric Co., Inc., Bluffton, Ind.

[22] Filed: Oct. 9, 1970

[21] Appl. No.: 79,472

[52] U.S. Cl. ....................................................417/38
[51] Int. Cl. .............................................F04b 49/02
[58] Field of Search ..............417/38, 36, 44; 137/210

[56] References Cited

UNITED STATES PATENTS

| | | | |
|---|---|---|---|
| 2,856,944 | 10/1958 | Morrison | 137/210 X |
| 3,457,865 | 7/1969 | Dunlap | 417/36 |
| 2,488,506 | 11/1949 | Bernhardt | 417/38 X |
| 3,070,021 | 12/1962 | Tutthill | 417/38 X |
| 3,207,076 | 9/1965 | Morgan et al. | 137/210 X |

*Primary Examiner*—William L. Freeh
*Assistant Examiner*—Richard Shea
*Attorney*—Hibben, Noyes & Bicknell

[57] ABSTRACT

In a liquid level sensor comprising a gas, such as air, filled column having the bottom end thereof exposed to a liquid, and a gas pressure sensing means which is activated by the liquid rising in the column and compressing the gas in the column, a method and apparatus for refilling or introducing gas into the column to compensate for any gas absorbed by the liquid, Thus, the reliability of the liquid level sensor is maintained and is not affected by the absorption of part of the gas by the liquid. The apparatus, in one form, comprises gas generating means for generating gas in the column, and in another form, comprises gas pumping means for pumping gas from the environment into the column. The apparatus, in still a third form, comprises liquid level control means for insuring lowering the level of the liquid to a point where gas or air from the environment may enter through the bottom of the column. The method and apparatus of the present invention, for example, may be incorporated in a control for an electric motor driving a sump pump for controlling the water level in the sump reliably for a period of years, the control being unaffected by absorption of part of the gas in the column by the water.

20 Claims, 14 Drawing Figures

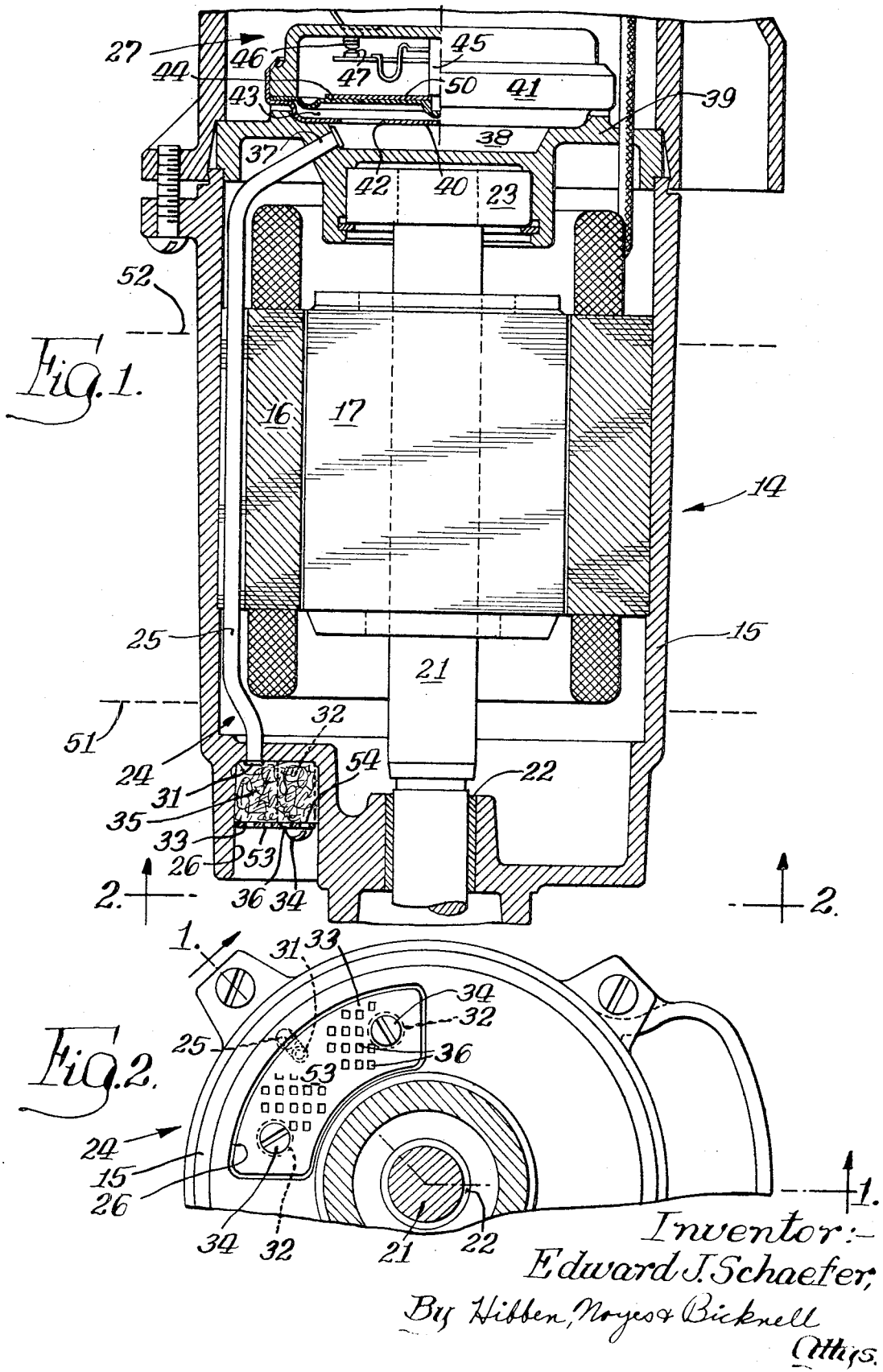

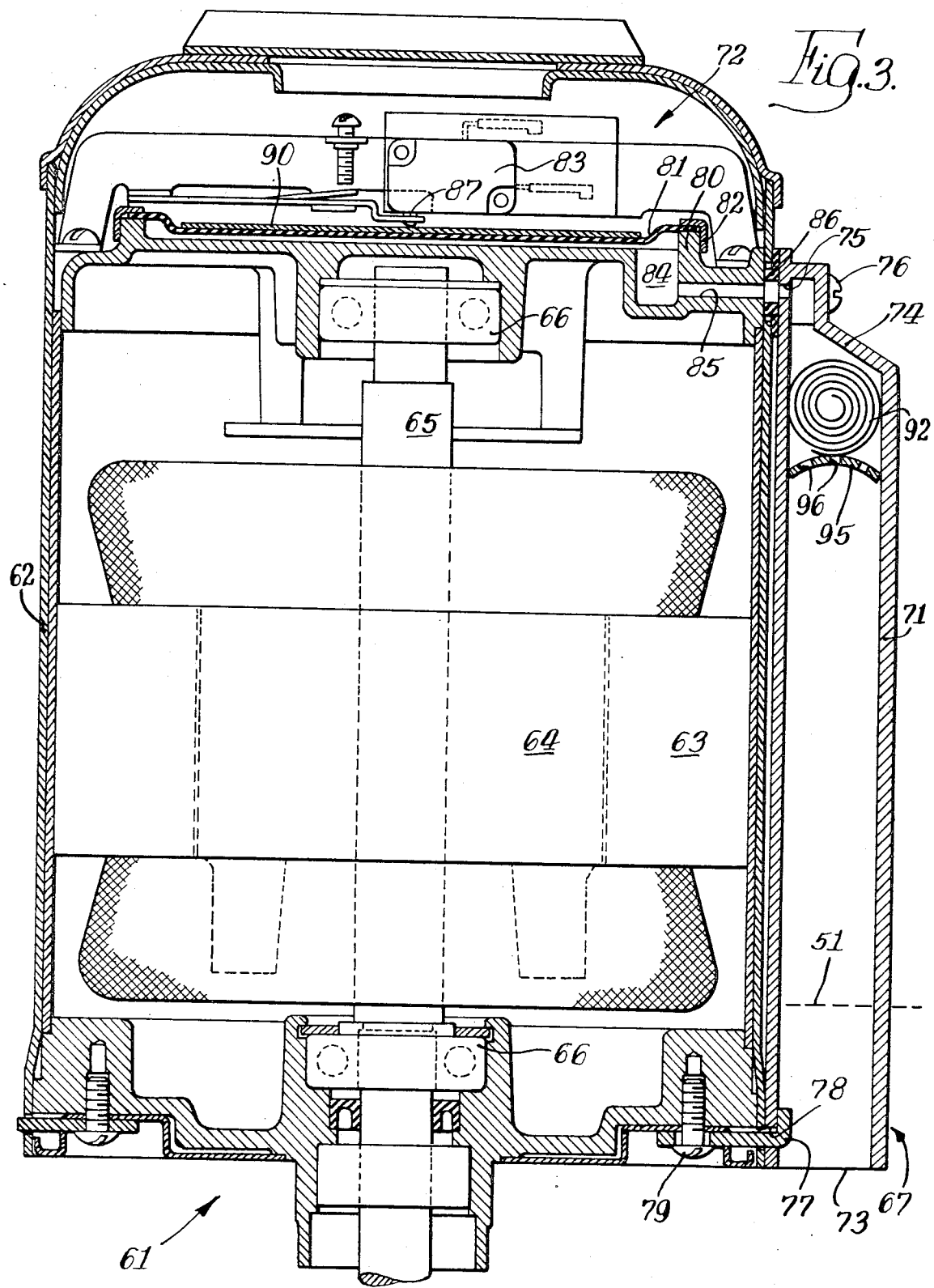

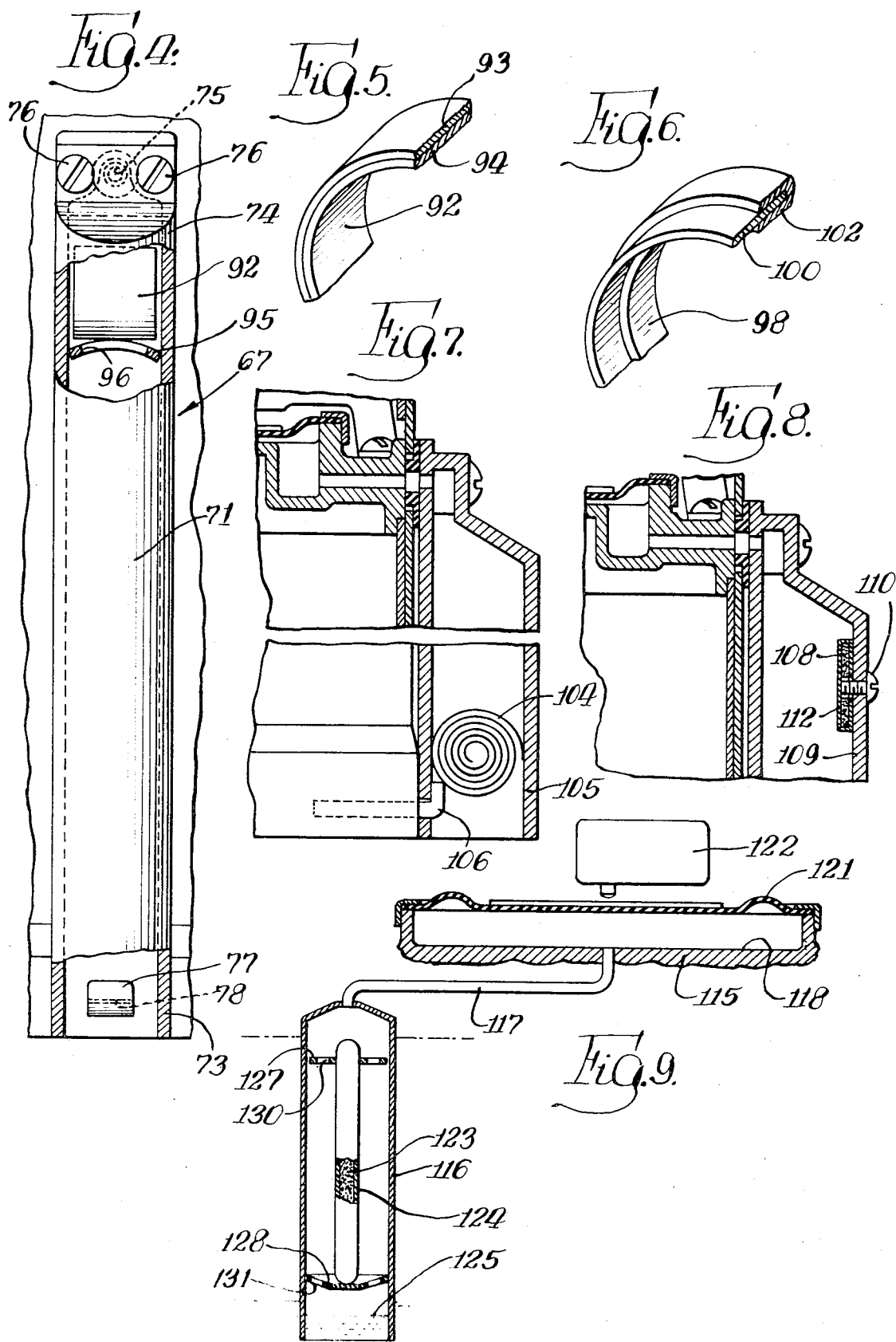

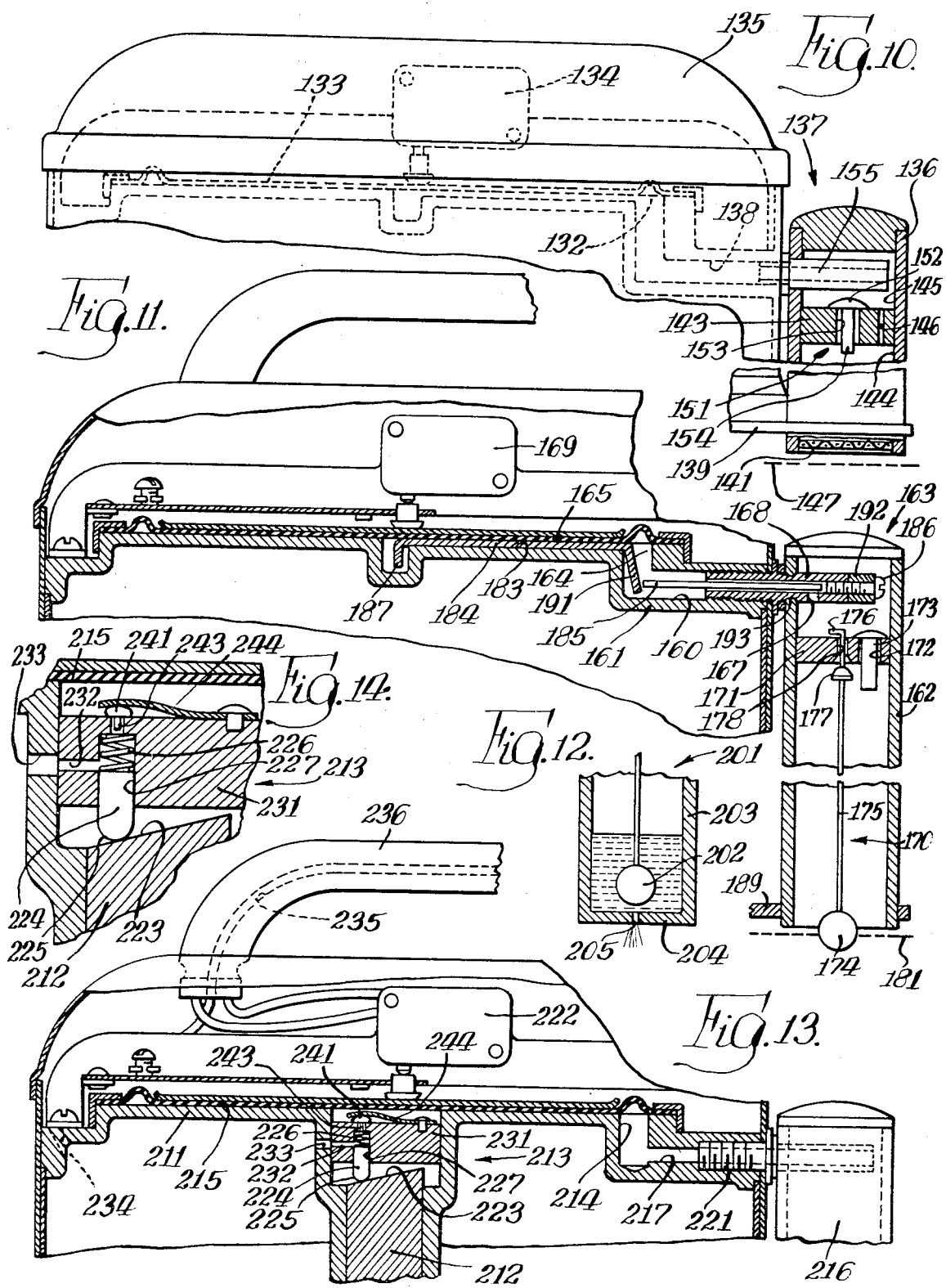

APPARATUS AND METHOD FOR A LIQUID LEVEL SENSOR

In many instances, it is desirable to sense a change in a liquid level to activate equipment in response to an increase in the liquid level. One such instance is in using the increase in the water level in a sump to activate a pump and lower the water to its original level.

One form of liquid level sensor of the prior art comprises a gas column, usually formed by a hollow member or tube, the bottom end of which is open or exposed to the liquid, and a pressure sensor device connected to the tube. As the liquid level rises in the tube, the liquid compresses the gas in the tube and the gas pressure is hereby increased. The increase in the gas pressure is sensed by the pressure sensor which is used to control apparatus such as a pump motor. Such liquid level sensors, while operative, have had the disadvantage that after a long period of use with the liquid level above the bottom of the tube, the gas in the column is partially absorbed by the liquid. Such absorption of the gas by the liquid reduces the pressure developed in the column upon subsequent rise of the liquid level and requires a higher liquid level to actuate the pressure sensor. This effect made operation of such liquid level sensors variable and unreliable.

Method and apparatus in accordance with the present invention overcomes the disadvantages of the prior art by maintaining the quantity of gas in a column for an extended period of time by introducing gas in the column to replace any gas absorbed by the liquid, thus maintaining the reliability of the liquid level sensor. The method of introducing replacement gas into the column may be accomplished by various methods such as by generating gas in the column, by refilling the column with gas from the environment as by pumping gas into the column, or by lowering the liquid level below the bottom of the column.

The apparatus of the present invention comprises means for providing a gas filled column having the lower end thereof exposed to liquid, a gas pressure sensitive device connected with the gas filled column, and means for introducing replacement gas into the column, which in one form comprises a gas generating means for generating gas, in another form comprises means for lowering the liquid level below the bottom of the column, and still in another form comprises means for pumping replacement gas into the column.

It is a primary object of this invention to provide a method and apparatus for increasing the reliability of a liquid level sensing device or sensor.

Another object of the present invention is to provide a method and apparatus for introducing replacement gas into a gas filled column of a liquid level sensing device to compensate for gas absorbed by the liquid.

These and other objects of the present invention will become more apparent from the following description and the accompanying figures of the drawings, in which:

FIG. 1 is a sectional view, taken along the line 1—1 of FIG. 2, of a motor and features one embodiment of the present invention;

FIG. 2 is a fragmentary sectional view taken along the line 2—2 of FIG. 1;

FIG. 3 is a cross sectional view of a second embodiment of the present invention having an external tube forming a gas column;

FIG. 4 is a fragmentary elevational view of the embodiment of FIG. 3, showing the structure in greater detail;

FIG. 5 is a fragmentary perspective view of a coil of the embodiment shown in FIG. 3;

FIG. 6 is a fragmentary perspective view similar to FIG. 5 of another form of coil;

FIG. 7 is a fragmentary cross sectional view of a third embodiment of the present invention;

FIG. 8 is a fragmentary cross sectional view of a fourth embodiment of the present invention;

FIG. 9 is a fragmentary cross sectional view of a fifth embodiment of the present invention;

FIG. 10 is a fragmentary cross sectional view of a sixth embodiment of the present invention;

FIG. 11 is a fragmentary cross sectional view of a seventh embodiment of the present invention;

FIG. 12 is a fragmentary cross sectional view of an eighth embodiment of the present invention;

FIG. 13 is a fragmentary cross sectional view of a ninth embodiment of the present invention; and FIG. 14 is an enlarged view of a portion of FIG. 13.

In FIG. 1 is illustrated a motor 14 for a pump (not shown), for example. The motor 14 is supported on the upper portion of the pump housing (not shown), and both the motor and the pump can be placed in a sump. The pump is a conventional design including a liquid inlet, an outlet, and an impeller for pumping liquid. Liquid, for example water in the sump is required to be maintained at a generally constant level which is above that of the inlet of the pump. Upon flow of additional water into the sump, the water level rises and, as is hereinafter described, causes the motor to be activated and thereby pumps some of the water out of the sump to lower the water level therein.

The motor 14 as shown has a housing 15, a stator 16, a rotor 17 carried on a shaft 21 which is supported by bearings 22 and 23. The shaft 21 extends downwardly out of the housing 15 for connection with the pump impeller (not shown) of the pump.

To turn the motor 14 on and off, there is provided a liquid level sensing means or device comprising a gas column 24 filled with a gas, such as air, the column 24 being formed by a tube 25 located within the housing 15 and by a chamber 26 formed in the underside of the housing 15, and comprising a gas pressure sensing means 27 located in the upper end of the housing 15. The tube 25 has a lower end 31 which opens into the chamber 26, the latter being exposed at its bottom to the water filling the sump. The housing 15 has downwardly extending bosses 32 in the chamber 26 to which is secured a screen or perforated retainer 33 as by screws 34. The chamber 26 is preferably filled with a filter material 35, such as brass wool, which prevents dirt or contaminants in the water from plugging the tube 25. The retainer 33 has formed therein perforations 36 over substantially its entire surface so that liquid in the sump may pass through the retainer 33 and at least partially fill the chamber 26.

The upper end 37 (FIG. 1) of the tube 25 extends into an upper chamber 38 formed in the housing 15 above the stator and the rotor. The upper side of the chamber 38 is formed by a can 41 which encloses the gas pressure sensing means 27 and the lower side of the chamber 38 is formed by an upper end bell of the motor. A plate 40 extends across the chamber 38 and has an opening 42 therein which connects the tube end 37 with a diaphragm chamber 43 formed below a diaphragm 44 secured within the can 41 above the plate 40. Changes in pressure of the gas filling the diaphragm chamber 43 cause the diaphragm 44 to flex and thus move a button 45. The button 45 is supported by a flat rigid disk 50 which is fastened to the upper surface of the diaphragm 44 in the center area thereof, and the button 45 is connected to actuate electrical contacts 46 and 47 to operate the motor. The contacts 46 and 47 are part of a switch which is similar to the switch described in my U.S. Pat. No. 3,246,186. The switch is of the over center type which is actuated on and off at different liquid levels so as to prevent continued turning on and off of the motor.

If the water level rises, for example, above the level represented by the dashed line 51, the gas trapped in the chamber 26, the tube 25 and the chamber 43 is increasingly compressed and moves the diaphragm 44 upwardly, thus closing the contacts 46 and 47. When the motor is turned on, and the pump pumps the liquid level down, the pressure in the chamber 43 is reduced, contacts 46 and 47 open, and the motor and pump stop.

After the motor has been installed in a sump, for example, some of the gas in the column formed by the chamber 26 and tube 25 is usually absorbed by the liquid in the lower end of the column. If the absorbed air were not replenished or replaced, it would be necessary for the liquid to rise to the level represented by a dashed line 52, for example, before the pressure in the column is sufficient to actuate the pressure sensing means 27. Such an occurrence is, of course, undesirable because it is desired that the pump and motor maintain the liquid in the sump at a constant liquid level.

This disadvantage has been overcome by the present invention which provides method and apparatus for introducing replacement gas into the column of the level sensor to compensate for any gas absorbed by the liquid.

The preferred method for introducing replacement gas comprises electrochemical means for slowly generating such gas, such as a corrosion cell connected to the gas column. As is well known, electrolytic corrosion cells generate gas, and such gas generated is used in accordance with the present invention to replace the gas absorbed by the liquid and thereby maintain the reliability of the liquid level sensor. The electrodes of the corrosion cell may consist of two dissimilar materials, or they may be of the same material, a cell of the latter type depending upon local variations in the material to form the cathode and anode. Such a cell has its cathode and anode electrically connected together and the cell may be placed either in the liquid directly or in a position where it is exposed to the vapors of the liquid. One advantage of placing the cell in the vapor rather than directly in the liquid is that polarization due to contamination of the electrodes would be avoided.

The amount of gas generated by the corrosion cell depends upon the type of materials used in the cell, the type of liquid or vapors in which they operate, and also the area of the materials exposed. The anode will be gradually consumed over a period of time, and if extremely long life is contemplated, the consumption of the anode will have to be taken into account. As an example, a gas column having a circular interface of approximately 0.75 inch diameter will require the generation of approximately one quarter of a cubic inch of gas per year at atmospheric pressure to replace the gas lost due to absorption by the liquid. If it is contemplated that gas must be generated over a ten year life of a motor, a corrosion cell must be provided which is capable of generating at least 2½ cubic inches over a 10 year period. Since the anode is gradually consumed, its initial size must be sufficient to enable generation of the required quantity of gas over the required time period. A table is given hereinafter showing gas generation rates and anode consumption rates of various materials. It is not detrimental if an excess amount of gas is generated because any excess gas will simply escape through the open bottom of the air column.

With reference to FIG. 1, the motor 14 includes a corrosion cell having two electrodes in the chamber 26 exposed to the liquid or liquid vapor, the two electrodes being electrically connected. While the retainer 33 could be one electrode and a portion or all of the wall of the cavity 26 could be the other electrode, in the present instance, the retainer 33 forms both electrodes. It is made of galvanized iron or steel and therefore has a zinc coating 53 on the bottom side 53 thereof and an iron or a steel body which is exposed on the top side 54 thereof. The iron and the zinc of the galvanized retainer are of course inherently electrically connected, and they react with the liquid, or with a vapor of the liquid, to produce hydrogen gas. The gas thus produced replaces the gas which is normally absorbed as discussed above by the liquid and thereby maintains the gas column 24 filled.

While an iron and zinc corrosion cell is preferred, other corrosion cells, such as a copper and zinc cell, or a cell having magnesium for both electrodes would also work. Below are listed some of the characteristics of corrosion cells materials, the gas evolution volume being measured at a temperature of 0°C and at a pressure of 760 mm Hg.

| Cathode | Anode | Location of cell in column | anode area in$^2$ | anode consumption grm./yr | Gas evolution in$^3$/in$^2$/yr |
|---|---|---|---|---|---|
| Mg (pure) | Mg(pure) | Vapor space | 3.0 | 0.071 | 1.14 |
| Cu | Zn | Submerged | 2.6 | 0.106 | 0.83 |
| Fe (Steel) | Zn | Submerged | 2.6 | 0.204 | 1.60 |
| Cu | Zn | Vapor space | 2.6 | 0.124 | 1.06 |
| Fe (low carbon steel) | Zn | Vapor space | 2.6 | 0.163 | 1.27 |

In FIG. 3 is illustrated a second embodiment of a motor 61 for a sump pump, the motor having a housing 62, a stator 63, and a rotor 64 carried on a shaft 65 which is supported by upper and lower ball bearings 66. The liquid level sensor, in this instance, comprises an external gas column 67 of, for example, air. The column 67 is formed by a tube 71 secured to the outside of the housing 62, and a pressure sensing means 72 is connected to the column 67. The tube 71 has its lower end 73 open so as to admit liquid, the upper end 74 of the tube being closed except for a small passage 75 formed in one side wall. The tube 71 is held against the motor housing as by screws 76 threaded into the top of the housing 62, and by a bent tab 77 which fits in a slot 78 near the bottom of the tube 71, the tab 77 being secured to the housing 62 as by a screw 79.

The pressure sensing means in this instance comprises a diaphragm 81 fastened at its outer edge to the upper end bell 80 of the motor by a ring 82 having a press fit on the upper end bell. A rigid disk 90 covers the center area of the diaphragm 81 and an electrical switch 83 is located above the disk 90 and is actuated by movement of the diaphragm 81. The diaphragm 81 forms one wall of a chamber 84 which communicates with the passage 75 by a bore 85 in the end bell 80, and a seal 86 is placed between the tube 71 and motor housing 62. The switch 83 includes a button 87 which rests on the disk 90 and is operated by the diaphragm 81.

If the water level rises above the level represented by the dashed line at 51, for example, the gas in the column 67, the passages 75 and 85, and the chamber 84 is compressed and it moves the diaphragm 81 and the disk 90 upwardly to close the switch 83 and turn the motor on. When the water level drops due to operation of the pump, the gas pressure in the column drops, the diaphragm 81 moves down, and the switch 83 is actuated to turn the motor off.

As shown in FIGS. 3, 4 and 5, a corrosion cell including iron and zinc electrodes is contained in the upper end of the tube 71 and reacts with water vapor filling the tube above the water level. The cathode and anode electrodes of the cell are on a bimetallic member in the form of a coil 92 having iron 93 (FIG. 5) on one side thereof and zinc 94 on the other side thereof. The cell is in the form of a cylindrical coil because such a coil forms a large surface area. The coil 92 is held in position in the tube 71 by a retainer 95 which has slots 96 therein to permit passage of vapor and gas therethrough. The retainer 95 is a spring-like member and is simply pushed into the tube 71 after the coil 92 has been inserted. The retainer 94 is preferably located high enough so that the motor and pump will be turned on before water reaches the coil 92.

In FIG. 6 is another form of coil 98, in which a portion 100 is made of a metal such as steel which includes iron, the portion 100 being partially coated with zinc 102, thus forming the cathode and anode of the corrosion cell.

In FIG. 7 is shown a portion of a motor similar to the motor of FIG. 3 having a corrosion cell in the form of a coil 104 which is similar to the forms of the coils 92 or 98 previously shown. The coil 104 is located adjacent the lower end of a tube 105 so that at least a portion of coil 104 is submerged in the liquid. The anode and cathode portions of coil 104 react directly with the liquid, the coil 104 being held in the tube 105, which is similar to the tube 71, by a tab 106 similar to the tab 77.

The gas for replacing the gas absorbed by the liquid may be introduced by chemical means. While it is possible to use a chemical or other material that would continuously give off or emit a gas, it is preferred, in view of the time the device may be stored before being sold or used, that a chemical be used which is activated or put into a useable state just prior to installation or inherently by using the device. In the latter instance, in a liquid level sensor for a sump pump a chemical could be used which would be activated when exposed to water vapor or water. A number of chemicals which could be used for this purpose and their reactions are listed below:

| Chemicals or Reactants | Reactions | Gas Evolved |
|---|---|---|
| ammonium nitrite | $NH_4NO_2(aqueous)=N_2+H_2O$ | nitrogen |
| hydroxylamine | $2NH_2OH+H_2O=2NH_4bmz1\tfrac{1}{2}0_2$ | oxygen |
| hydroxylamine & sodium nitrosyl | $NaNO+H_2O=NaOH+NOH$ $NH_2OH+NOH=N_2+H_2O$ | nitrogen |
| hydrazine sulfate & ferric sulfate | $N_2H_5^+ + Fe^{\pm 3} = Fe^{+2}+NH_4^+ + \tfrac{1}{2}N_2 + H^+$ | nitrogen |
| Ammonium chloride & ammonium hypochlorite (or sodium hypochlorite) | $NH_4Cl+3NH_4ClO=N_2 2NH_4^+ + 4Cl^- + 2H^+ + 3H_2O$ | nitrogen |
| sodium azide & cerric chloride | $2NaN_3+2Ce^+ + ^+ 2H_2O=$ $3N_2+2NaOH+2Ce^{+2}+2H^+$ | nitrogen |
| beryllium carbide | $Be_2C+H_2O=CH_4+Be(OH)_2$ | methane |
| aluminum carbide | $Al_4C_3+H_2O=CH_4+Al(OH)_3$ | methane |
| manganese carbide (or iron carbide or nickle carbide) | $Mn_3C+H_2O=$ $CH_4+Mn(OH)_3$ | methane plus hydrogen |

With specific reference to FIG. 8, a member 108 in the form of a tablet is secured as by a screw 110 in the tube 109 of a motor similar to the motor shown in FIG. 2. The member 108 may be made of one of the foregoing listed chemicals. To retard the reaction of the chemical with water vapor, it may be desirable to completely encase the chemical in a slightly water permeable and gas permeable coating or film 112, such as a fluorohalocarbon film, or a film sold by the Dow Chemical Co. under the trademark "Saran" which is a thermoplastic resin produced by the polymerization of vinylidene chloride alone or with other monomers. The film 112 permits only a very small quantity of water vapor or water to pass therethrough to react with the chemical member 108 and permits the gas evolved by the reaction to pass outwardly through the film into the gas column. It should be understood that chemical means may also be used in a motor constructed as shown in FIG. 1 with the chemical material located in the upper end of the chamber 26.

In FIG. 9 is shown a portion of a motor including a housing 115 and a tube 116 forming a gas column. A hose 117 connects the upper end of the tube 116 to a chamber 118 formed in the housing 115, the upper portion of the chamber 118 being sealed by a diaphragm 121 which operates a switch 122 in the manner described with regard to FIG. 1. The chemical member 123 is in the form of a rod located generally coaxially within the tube 116. Here the chemical member 123, which may be one of the foregoing listed chemicals, reacts with water to generate a gas to replace any gas absorbed by the liquid in the sump. The rod 123 is coated with a water soluble material, such as gelatin, indicated at 124, which will not react with the chemical rod 123 but permits a small quantity of water to reach the chemical so that the chemical will react slowly with water to generate gas, thus extending the life of the chemical. The rod 123 is located in the tube 116 so that its lower end is above the normal water level 125 in the tube. When the water level rises higher than desired due to absorption of some of the gas by the water, the water will contact the lower end of the rod and reacts with the chemical to generate gas. The pressure of the replacement gas forces the water level downwardly to its normal level where it is out of contact with the rod 123, thus stopping the reaction. The rod 123 is supported by an upper retainer 127 and by a bottom dish-shaped retainer 128. The retainers 127 and 128 respectively have openings 130 and 131 for the passage of gas, the openings 131 also permitting liquid to pass therethrough. The lower retainer 128 is fixed in position and supports the rod 123. The upper retainer 127 is preferably attached to the rod 123 and is slideable within the tube 116 so that the rod 123 and the retainer 127 move downwardly as the lower end of the rod 123 is dissolved.

Another method for the introducing of gas into the column to replace any gas absorbed by the liquid is to lower the liquid level in the sump below the bottom open end of the column, so that air from the environment may enter the column and thereby replace the air absorbed by the liquid. This result is accomplished by delaying turning off the motor and pump until the pump has lowered the liquid level below the bottom end of the column. While electrical means, such as a delayed action electrical switch, may be used, mechanical means is illustrated in FIG. 10. A motor, similar to the motor shown in FIG. 11, comprises a housing 135, a tube 136 similar to the tube 71, and level control means 137. A chamber 132 is formed in the housing 135 and is closed by a diaphragm 133. The chamber 132 is connected to the tube 136 by a passage 138, and the diaphragm 133 operates a switch 134 to activate the motor in response to the gas pressure in the tube 136, the passage 138, and the chamber 132. The tube 136 at its lower end has a mounting arm 139 which secures the tube 136 to the motor housing, and a screen 141 which prevents dirt in the liquid from entering the tube 136.

The level control means 137 comprises a partition or a wall member 143 dividing the tube 136 into a lower chamber 144 and an upper chamber 145, and has an orifice 146 therein. As the water level rises from the bottom of the tube 136 the gas within the tube is compressed. The orifice 146 permits slow passage of the compressed gas from the lower chamber 144 to the upper chamber 145. Upon reaching sufficiently high pressure due to a rise of the water in the sump, the gas in the upper chamber 145, which is connected to the chamber 132 in the housing, will activate the pressure sensing switch 134, starting the motor and the pump. The pump then pumps the water out of the sump, and the gas pressure is reduced as the water level is reduced. Considering the flow of air through only the orifice 146, since the orifice restricts the flow of air the level of the water in the tube 136 will be behind or retarded relative to the level outside the tube. Since the water level in a sump often rises relatively slowly, the above retardation when the water level is rising is relatively little and may be neglected. Upon a drop in water level when the motor is on, the air in the upper chamber 145 leaks back through the orifice 146 into the lower chamber 144, thus reducing the pressure in the upper chamber. After the pressure has been sufficiently reduced in the upper chamber 145, the pump and motor stop. The orifice 146 is sized to produce a retardation such that the pump will have operated sufficiently long as to lower the water level below that of the bottom of the tube 136, as to the level indicated by the dashed line 147. Air from the environment will then enter the tube 136 and replace any gas absorbed by the liquid. Thus, the tube 136, at the beginning of each cycle of operation, will always be completely filled with a supply of air.

If necessary, the delayed response in starting the motor can be eliminated by providing a one-way valve 151 (FIG. 10) which permits air to quickly enter the upper chamber 145 but blocks air flow downwardly, and comprises a head 152 which normally seals a large opening 153 formed in the wall 143. A stem 154 formed on the head 152 extends into the opening 153 and guides the head and retains the valve in the opening 153. The head 152 will abut a tubular extension 155 of the passage 138 to prevent the valve 151 from falling out should the motor be inverted. If desired, the one-way valve 151 and the orifice 146 may be combined in one structure such as a ball valve made of an air permeable material such as porous plastic.

Another embodiment of the present invention is shown in FIG. 11, and comprises a motor having a housing provided with an end member 161, a tube 162, and a level control means 163. The tube 162 is removably secured to the motor, as is hereinafter described. A chamber 164 is formed by a diaphragm 165 and the end member 161. The chamber 164 communicates with the interior of the tube 162 by a radial bore 160 in the end bell 161. Within the bore 160 is threaded a tubular member 168 having a radial hole 167 opening into the interior of the tube 162. The diaphragm 165 operates a switch 169 in response to gas pressure in the tube 162. The level control means comprises a liquid operated valve and a partition or a wall 171 dividing the tube 162 into upper and lower portions. The wall 171 has an inlet orifice or opening 172 closed by a one-way valve 173. While the valve may be in the form of a diaphragm operated by the liquid level, in this instance, the valve is in the form of a float valve 170 and comprises a bowl or float 174 suspended just below the bottom of the tube 162 on a stiff rod 175 extending upwardly through an opening 178 in the wall 171. Mounted on the rod 175 adjacent its upper end and below the wall 171 is a valve body 177 adapted to close the opening 178 when the float 174 rises. The upper end of the rod 175 is bent, as at 176, to retain the rod in the opening 178. In operation, as the liquid level rises, the float 174 is buoyed upwardly and the valve body 177 closes the opening 178. The air or gas in the tube 162 is compressed and enters the upper portion of the tube 162 through the orifice 172 to actuate the switch 169. As the liquid level drops due to pumping, the float valve 170 stays closed until the liquid level is pumped below the bottom of the tube 162 and to the level 181 at which the float 174 starts to move downwardly, so that gas or air from the outside can enter the bottom end of the tube 162 to replace any gas that may have been absorbed by the liquid. After the liquid level has further dropped so that the float 174 no longer is buoyed up, the float 174 and the valve body 177 move downwardly. Thus, the float valve 170 opens and the pressure in the upper portion of the tube 162 is reduced and the motor is turned off. No air can leave by way of the orifice 172 since it is closed or sealed by the check valve 173 which permits air to pass only from the lower portion to the upper portion of the tube 162.

Further, in the embodiment of FIG. 11 is provided means for manually operating the switch 169 which controls the motor. The means for manually operating the switch 169 comprises a lever 184 which lies in a radial groove 183 formed in the upper surface of the end member 161. The lever 184 underlies the diaphragm 165 and has downwardly bent ends 187 and 191. The end 191 of the lever 184 is bent, as shown in FIG. 11, so that the lever is free to pivot on the member 161 at the apex of the bend at the end 191. The lever 184 may be pivoted by forcing a rod 185 against the end 191 of the lever 184 with a screw 186. To this end the rod 185 loosely extends in the tubular member 168, and the screw 186 is threaded into the outer end of the tubular member 168. A spacer 192 is provided between the head of the screw 186 and the tubular member 168 to prevent the screw from accidentally pivoting the lever 184. To convert the motor to manual control, the tube 162 is removed from the motor to expose the screw 186 by removing a bottom retainer, such as member 189, and pulling the tube free from the tubular member 168, the tube having an opening 193 which engages detents in the tubular member 168 to seal the tube to the tubular member. The screw 186 and the spacer 192 are removed, and the screw is then rethreaded into the tubular member 168 until the screw 186 forces the rod 185 to pivot the lever 184 to actuate the switch. The motor may be returned to automatic level sensing control by reversing the above procedure.

Another embodiment of the present invention is illustrated in FIG. 12 and includes control means 201 similar to that shown in FIG. 11. However, a float 202 is contained entirely within a tube 203 which in applications where the motor is subjected to rough handling is advantageous. The bottom of the tube is closed by a bottom wall 204 having a small orifice 205. The remainder of the structure is similar to that shown in FIG. 11. The operation of the control means 201 is similar to the control means 163 previously described, except that the exit of the liquid through the orifice 205 from the bottom of the tube 203 is restricted and delays shutting off of the pump until the liquid level has dropped to a level below the bottom of the tube 203. After the liquid has been completely discharged from the tube 203, air from the environment enters the tube 203 to replace any air absorbed by the liquid. It should be understood that the opening closed by the float valve may be sized to prevent turning off the motor until the liquid level has dropped below the bottom of the tube, in such instance the bottom of the tube need not be closed by a bottom wall such as wall 204.

Still another embodiment is shown in FIGS. 13 and 14 and includes a motor having a housing provided with an end bell 211, a shaft 212 and pump means 213 for the liquid level control. A chamber 214 is formed in the end bell 211 and is closed by a diaphragm 215. The chamber 214 is connected to a tube 216 by a radial passage 217 in the end bell, and by a tubular member 221. The diaphragm 215 actuates a switch 222 in response to the gas pressure caused by liquid rising in the tube 216. The pump means 213 includes an inclined end 223 on the upper end of the shaft 212, and a piston 224. The piston 224 has a rounded end 225 which engages the end 223 of the shaft 212, and a spring 226 holds the piston in engagement with the shaft. The piston 224 reciprocates in a cylinder formed by an enlarged end of a bore 227 in a wall member 231. As shown in FIGS. 13 and 14, in the lowest position the piston opens one end of an air inlet passage 232 which in turn is in communication with the air outside of the motor, by such means as an opening 233 in the end bell 211, through the interior of the end bell, a passage 234 adjacent the periphery of the end bell, and a passage 235 in an electrical cord 236 which supplies power to the motor. Passages such as the passage 235 in the cord 236 are normally found in conventional cords. Thus, air may be supplied to fill the bore 227. As the shaft 212 rotates, the piston 224 moves upwardly to expel the air from the bore 227 into the chamber 214 below the diaphragm 215. Thus, the air absorbed by the liquid is replaced. When the shaft 212 is not rotating or when the plunger 224 is moving downwardly, a check valve 241 having a head for sealing the small end of the bore 227, a stem 243 for guiding the valve loosely fitting within the small end of the bore 227, and a leaf spring 244 for closing the valve, keeps air from passing through the bore 227. The pump means 213 generally need have only a small volume capacity, and the minimum size mechanical air pump which can be built economically will have more than sufficient capacity. The fact that the pump means 213 has excess capacity will not affect the operation of the liquid level sensor since any excess air will only bubble out of the bottom of the tube 216. As soon as the liquid level drops to the bottom of the tube 216 by operation of the liquid pump, the pressure in the chamber 214 and in the tube 216 will drop, thus shutting off the motor.

It should be understood that it is within the scope of the present invention to provide a supply of compressed gas which is slowly leaked into the gas column during the life of the motor, or to provide a radioactive alpha emitter which upon decay will produce gas such as helium.

It will be apparent from the foregoing that a novel and useful method and apparatus for introducing gas into a gas column of a liquid level sensor, to replace any gas absorbed by the liquid, has been provided.

I claim:

1. In a liquid level sensor including means for providing a gas column and a pressure sensing means responsive to the pressure in said gas column, said gas column being exposed at the lower end thereof to a liquid so that variations in said liquid level vary the pressure of said gas column, the improvement comprising means for generating a replacement gas into said column for replacing any gas absorbed by said liquid, said means for generating said gas comprises a corrosion cell.

2. The combination of claim 1, wherein said corrosion cell comprises an anode and a cathode of different materials.

3. The combination of claim 2, wherein said anode is formed of zinc and said cathode is formed of iron.

4. In a liquid, level sensor for operating a motor and pump in response to variations of the level of a liquid to be pumped, said sensor including means forming a gas column and pressure sensing means, said column means containing gas, and being open to said liquid, said pressure sensing means being connected to said column means and activating said motor in response to the pressure of the gas, the improvement comprising means for introducing gas into said column means for replacing gas absorbed by said liquid said means for introducing gas comprises a corrosion cell having electrodes reacting with said liquid to produce gas and being located to provide gas to said column.

5. The combination of claim 4, wherein said cell has electrodes comprising an anode and a cathode in the form of a bimetallic member.

6. The combination of claim 5, wherein said bimetallic member is galvanized ferrous metal.

7. The combination of claim 4, wherein said cell has two electrodes located in said column means.

8. The combination of claim 4, wherein said column means includes a thin tube within said motor, said column means having filter means for preventing clogging of said thin tube.

9. The combination of claim 8, wherein said filter means comprises wool-like filaments, and a retainer for holding said filaments.

10. In an electric motor for driving a sump pump adapted to be installed in a sump and to pump water therefrom, the improvement of means to turn the motor on when the liquid in the sump is at a first level and to turn the motor off when the liquid is at a second level which is lower than said first level, comprising a pressure responsive switch connected in the motor circuit to control energization thereof, a hollow column communicating at its upper end with said switch and extending downwardly to a level which is below said first level, said column having an opening therein adjacent its lower end permitting liquid from said sump to enter said column and to trap gas between said liquid and said switch, liquid pressure on said trapped gas increasing the pressure on said gas and thereby actuating said switch when the liquid rises to said first level and decreasing the pressure on said gas and thereby deactuating said switch when the liquid drops to said second level, said gas having the characteristic that it is absorbable by said liquid, and means in said hollow column for replacing the quantity of said gas which is absorbed by said liquid.

11. The apparatus defined in claim 10, wherein said replacing means comprises a corrosion cell.

12. The apparatus defined in claim 10, wherein said replacing means comprises a chemical which reacts with said liquid to produce gas.

13. Apparatus responsive to variations in the level of a liquid comprising means forming a hollow column closed at its upper end and having an opening adjacent its lower end, said lower end being adapted to be disposed in said liquid so that said liquid rises around the outside of said column means and some of said liquid enters said opening, said column means having gas trapped therein above said liquid and said gas being absorbable by said liquid, switch means responsive to pressure of said gas due to changes in the level of the liquid, and means in communication with the interior of said column means for introducing a gas into said gas column to replace the quantity of said gas which is absorbed by said liquid.

14. The combination of claim 13, wherein said means for generating gas comprises chemical means.

15. The combination of claim 14, wherein said chemical means reacts with said liquid to produce gas.

16. A liquid level sensor for controlling the operation of a device in response to the level of a liquid, comprising means forming a gas column, pressure responsive switch means adapted to be turned on at a first pressure and to be turned off at a second pressure which is lower than said first pressure, said switch means being in pressure communication with the upper end of said gas column and being responsive to the gas pressure in said upper end, means for supporting said column means with the lower end thereof submerged in said liquid, said column means having an opening adjacent the lower end thereof permitting said liquid to enter said column means, said gas and said liquid having the characteristic that said gas is absorbable by liquid in said column means and further comprising means in said column means for replacing the quantity of gas absorbed by said liquid.

17. The combination of claim 16, wherein said means for introducing gas comprises chemical means located in said column means.

18. The combination of claim 17, wherein said chemical means reacts with said liquid being pumpted to produce gas.

19. The combination of claim 17, wherein said chemical means has a coating for retarding the production of gas.

20. Apparatus responsive to variations in the water level in a sump comprising means forming a hollow column closed at its upper end and having an opening adjacent its lower end, said lower end being adapted to be disposed in said water so that said water rises around the outside of said column means and some of said water enters said opening, said column means having air trapped therein above said water, said air being absorbable by said water even though they have different compositions, switch means responsive to changes in the pressure of said trapped air due to changes in the level of the water, and means in communication with the interior of said column means for introducing a gas into said column to replace the quantity of said air which is absorbed by said water.

* * * * *